(12) United States Patent
LaCamera

(10) Patent No.: US 6,475,260 B2
(45) Date of Patent: Nov. 5, 2002

(54) CARBOTHERMIC ALUMINUM PRODUCTION USING SCRAP ALUMINUM AS A COOLANT

(75) Inventor: Alfred F. LaCamera, Trafford, PA (US)

(73) Assignee: Alcoa Inc., Pittsburgh, PA (US)

( * ) Notice: Subject to any disclaimer, the term of this patent is extended or adjusted under 35 U.S.C. 154(b) by 0 days.

(21) Appl. No.: 09/939,857

(22) Filed: Aug. 27, 2001

(65) Prior Publication Data

US 2002/0029656 A1 Mar. 14, 2002

Related U.S. Application Data

(63) Continuation of application No. PCT/US00/00287, filed on Jan. 6, 2000.
(60) Provisional application No. 60/115,257, filed on Jan. 8, 1999.
(51) Int. Cl.[7] .............................................. C22B 21/02
(52) U.S. Cl. ....................................... 75/10.27; 75/674
(58) Field of Search ................................ 75/10.27, 674

(56) References Cited

U.S. PATENT DOCUMENTS

| 3,234,008 A | * | 2/1966 | Johnson ..................... 75/10.27 |
| 3,723,093 A | | 3/1973 | Shiba et al. |
| 3,975,187 A | | 8/1976 | Kibby |
| 4,409,021 A | | 10/1983 | Moore |

FOREIGN PATENT DOCUMENTS

GB        1198294        7/1970

* cited by examiner

*Primary Examiner*—Melvyn Andrews
(74) *Attorney, Agent, or Firm*—Douglas G. Glantz; Glenn E. Klepac

(57) ABSTRACT

A process for producing aluminum metal by carbothermic reduction of alumina ore. Alumina ore is heated in the presence of carbon at an elevated temperature to produce an aluminum metal body contaminated with about 10–30% by wt. aluminum carbide. Aluminum metal or aluminum alloy scrap then is added to bring the temperature to about 900–1000° C. and precipitate out aluminum carbide. The precipitated aluminum carbide is filtered, decanted, or fluxed with salt to form a molten body having reduced aluminum carbide content.

13 Claims, No Drawings

CARBOTHERMIC ALUMINUM PRODUCTION USING SCRAP ALUMINUM AS A COOLANT

CROSS REFERENCE TO RELATED APPLICATION

This application is a continuation of PCT/US00/00287 filed Jan. 6, 2000, having priority based upon U.S. Provisional Application No. 60/115,257, filed Jan. 8, 1999.

BACKGROUND OF THE INVENTION

1. Technical Field

This invention relates to a carbothermic process for the direct thermal reduction of aluminum oxide to form aluminum metal.

2. Background

The predominant commercial process today for producing aluminum metal is the Hall-Heroult process of electrolytically dissociating alumina dissolved in a fused cryolitic bath at a temperature less than about 1000° C. Many attempts have been made to replace this process and produce aluminum commercially by a direct thermal reduction process of aluminum oxide with carbon at sufficiently high temperatures according to a reaction written as equation (1).

$$Al_2O_3 + 3C \rightarrow 2Al + 3CO \qquad \text{Eq. (1)}$$

Aluminum may be produced by the carbothermic direct thermal reduction of alumina, e.g., in an open or submerged-arc electric or slag resistance heating furnace. The scientific principles involved in the chemistry and thermodynamics of the reactions are now fairly well understood (C. N. Cochran, Metal-Slag-Gas Reactions and Processes, Electrochem. Soc., Princeton, N.J. 1975, pp. 299–316; K. motzfeldt and B. Sandberg, Light Metals 1979, A I M E, New York, N.Y. 1979, Vol. 1 pp. 411–428, and references cited therein). Nonetheless, no commercial process based on these principles has been established.

INTRODUCTION TO THE INVENTION

The carbothermic direct thermal reduction process involves reacting an aluminum oxide containing compound with a reductant which is usually carbon, aluminum carbide, or a mixture thereof in an electric furnace to reduce the aluminum oxide to metallic aluminum. Although the reaction on first impression would appear to be a simple one, i.e., the reduction of aluminum oxide to aluminum, substantially pure aluminum is not obtained via conventional carbothermic processes and, in fact, the product tapped from the furnace is aluminum contaminated with aluminum carbide. The amount of contamination with aluminum carbide varies depending on the particular carbothermic process which is carried out, but, in general, conventional carbothermic processes result in the production of aluminum contaminated by 10–30% by weight of aluminum carbide.

The carbothermic direct thermal reduction process has presented a substantial technical challenge in that certain difficult processing obstacles must be overcome. For example, at the temperatures necessary for the direct thermal reduction of alumina to form aluminum, e.g., such as about 2050° C., the aluminum volatilizes to a gas of aluminum metal or aluminum suboxide rather than forming as aluminum metal liquid which may be tapped from the process. For this reason, most attempts have incorporated an electrical furnace for the purpose of reducing the amount of volatile gaseous constituents in the system.

In attempts to reduce alumina thermally with carbon in the absence of other metals or their oxides, substantial amounts of aluminum carbide are produced according to the reaction written as equation (2).

$$2Al_2O_3 + 9C \rightarrow Al_4C_3 + 6CO \qquad \text{Eq. (2)}$$

Equation (2) proceeds favorably at or above 1800° C. Other intermediate compounds also are formed such as oxycarbides by the reactions written as equation (3) and equation (4).

$$4Al_2O_3 + Al_4C_3 \rightarrow 3Al_4O_4C \qquad \text{Eq. (3)}$$

$$Al_4O_4C + Al_4C_3 \rightarrow 4Al_2OC \qquad \text{Eq. (4)}$$

The reduction of alumina by carbon, when carried out under reduced pressure, proceeds with aluminum oxycarbide and aluminum carbide as intermediate products written as equation (5) and equation (6).

$$2Al_2O_3 + 3C \rightarrow Al_4O_4C + 2CO \qquad \text{Eq. (5)}$$

$$Al_4O_4C + 6C \rightarrow Al_4C_3 + 4CO \qquad \text{Eq. (6)}$$

Below 1900° C., all reactants and products except CO are solids. To attain an equilibrium gas pressure of 1 atm, however, temperatures of around 2000° C. are required, the reaction mixture is partially molten, and the simple equations (5) and (6) are no longer directly applicable. Likewise, the final, metal-producing step might be written as equation (7).

$$Al_4O_4C + Al_4C_3 \rightarrow 8Al(l) + 4CO \qquad \text{Eq. (7)}$$

The equilibrium gas pressure for this reaction reaches 1 atm at about 2100° C. In a reduction furnace operated under atmospheric pressure, the reaction zone must be maintained at a temperature at least sufficient to give the equilibrium pressure of CO equal to 1 atm. Allowing for some over-pressure to drive the reaction means a temperature of about 2150° C. At this temperature, the system includes solid carbon plus two liquids, an oxide-carbide melt and a metallic melt or metal melt. Equation (7) is not applicable, and the metal-producing reaction may be written schematically as equation (8).

$$\text{(oxide-carbide melt)} + C(s) \rightarrow \text{(metal melt)} + CO \qquad \text{Eq. (8)}$$

Concurrent with the production of carbon monoxide and condensed products, volatile aluminum-bearing species $Al_2O(g)$ and $Al(g)$ also will be formed. In the first steps of the reaction, formally described by equation (5) and equation (6), the equilibrium pressures of $Al_2O$ and $Al$ amount to only a few percent of the equilibrium pressure of CO. In the final step, represented by equation (7) or equation (8), the proportions of $Al_2O$ and $Al$ in the equilibrium gas are higher, but not excessive. It has been shown, however, that the reaction between alumina and carbon proceeds via a mechanism involving a gas phase with a high proportion of $Al_2O$ and $Al$, and, as a consequence, the losses by volatilization will be higher than those expected from the equilibria. Further, the metallic melt has a lower density than that of the oxide-carbide melt and thus the metallic melt floats on top of the oxide-carbide melt. The CO gas evolved by reaction (8) must pass through the metal melt, which further increases losses by volatilization.

Volatilization of Al and $Al_2O$ from the hot zone does not necessarily lead to metal loss. In a submerged-arc furnace, the reaction gas passes upwards through layers of colder charge, where the metal-bearing vapors may condense, at the same time preheating the charge. With a high fraction of metal vapors in the gas, however, the charge runs too hot, and losses by volatilization occur.

A primary difficulty in the carbothermic production of aluminum is caused by the substantial solubility of carbon in the metal at reaction temperature, about 20 atom % C. when the metallic melt is in equilibrium with solid carbon. When the melt is cooled, the carbon precipitates as aluminum carbide as written in equation (9).

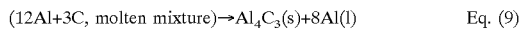

$$(12Al+3C, \text{molten mixture}) \rightarrow Al_4C_3(s)+8Al(l) \qquad \text{Eq. (9)}$$

About one-third of the metal value is precipitated as carbide. This necessitates a subsequent separation step, and recycling of the aluminum carbide, which is a disadvantage to the economy of the process.

Another difficulty in the carbothermic reduction of alumina in a submerged-arc furnace relates to the energy input and heat transfer. The metallic melt floats on top and will be directly underneath the electrodes. Because of the high electrical conductivity of the metal, the resistance in the furnace circuit will be low, and difficulties are experienced in maintaining an adequate energy input to the furnace. Further, the heat generation will take place predominantly on the surface of the metal, leading to very high metal temperature and substantial evaporation. To the extent this metal is condensed in the charge above the melt, it runs right back into the hot zone and is re-evaporated. The net result of this cyclic process of vaporization and condensation is that a large fraction of the generated heat is transferred upwards in the furnace, instead of being conducted downwards to the oxide-carbide melt where the heat is needed for the endothermic reaction (8).

The carbides and oxycarbides of aluminum readily form at temperatures lower than the temperatures required for significant thermal reduction to aluminum metal and represent a substantial slag-forming problem in any process intended to produce aluminum metal.

All the major oxides in bauxite except zirconia are reduced by carbothermic smelting before alumina is reduced. In practice, the oxides do not behave as simply as predicted. Instead, intermediate compounds are formed such as carbides, oxycarbides, and volatile subcompounds.

Most processes for the carbothermic production of aluminum always result in the production of aluminum contaminated with aluminum carbide, and the aluminum carbide contamination can be in the range of 20 weight percent or higher. A severe practical difficulty arises in attempting to purify aluminum contaminated with aluminum carbide in significant amounts because the mixture becomes non-pourable unless extremely high temperatures are maintained, such that the problem of purifying the mass becomes complex.

The amount of aluminum carbide contamination bears a direct relationship to the temperature employed, i.e., at the normal reduction temperatures employed in a furnace, the amount of aluminum carbide which can dissolve in the formed aluminum is about 20 weight percent or higher. Most processes result in the production of high aluminum carbide-containing products for the simple reason that they utilize uniform heating such that the majority of the charge was at a uniformly high temperature and, therefore, it was possible to dissolve aluminum carbide in appreciable amounts.

In one process, the furnace operation is carried out such that an intermittent type of heating is applied to the charge to be reduced so that a portion of the charge is at reaction temperature (about 2100° C.) but a majority of the charge is not at reaction temperature at any given time. Accordingly, when the formed aluminum flows over the charge, the charge is never at a temperature where more than about 10 weight percent aluminum carbide dissolves in the molten aluminum.

The present standards for commercially pure aluminum do not allow a significant quantity of aluminum carbide to be present, so that the furnace product from most carbothermic reduction processes must be subjected to further processing steps to reduce the aluminum carbide content to an acceptable level. The processes for reducing the aluminum carbide content from the product of a carbothermic reduction furnace have been found to be time consuming, expensive, and not economically feasible.

The aluminum carbide content of at least a portion of the aluminum produced by a carbothermic direct thermal reduction process can be decreased by cooling the furnace melt so that an aluminum carbide matrix is formed whereby the aluminum carbide matrix squeezes out aluminum to the surface of the melt and this aluminum can be removed by any suitable technique, including decanting. The aluminum removed in this manner is diminished in aluminum carbide content, but only a small portion of the available aluminum is recovered.

The yield of aluminum from a carbothermic reduction process can be enhanced by utilizing a mechanical working. A technique of this type subjects moving equipment under severe stress to very hot and corrosive conditions.

In one process, a mixture of aluminum contaminated with aluminum carbide in the molten state contacts certain gases which interact with or operate upon aluminum carbide to prevent the formation of an aluminum carbide matrix which would entrap the aluminum. Treatment involves blowing the gas through the body of the melt of aluminum and aluminum carbide.

Fluxing with metallic salts can diminish the amount of aluminum carbide contamination, but the molten salts mix with the carbide so removed, and it is costly to remove the carbide from the salt so that the carbide can be recycled to the furnace. Without such recycle, the power consumption and furnace size become uneconomical in comparison with methods practiced commercially today for making aluminum.

For over 100 years, aluminum has been produced by the two part Bayer-Hall process, wherein alumina ($Al_2O_3$) first is extracted from bauxite ore, and the alumina then is reduced electrolytically in molten cryolite (sodium aluminum fluoride) to free aluminum metal. Although the process has been highly successful commercially, it consumes large quantities of electricity and takes about four pounds of bauxite to produce one pound of aluminum. Bauxite typically comprises 45 to 60 percent aluminum oxide, 3 to 25 percent iron oxide, 2.5 to 18 percent silicon oxide, 2 to 5 percent titanium oxide, up to one percent other impurities, combined with 12 to 30 percent water of crystallization. The ore varies greatly in the proportions of its constituents, and in color and consistency. Gibbsite, boehmite, and diaspore are the hydrated aluminum oxide minerals normally found in bauxite.

The average grade of bauxite ore used in the Bayer-Hall process has continually declined. In 1930, ore used in the U.S. averaged 60 percent alumina, and by 1963, the average was less than 50 percent alumina. Although it is anticipated that this average will decrease to about 35 percent alumina in the future, the process is limited generally to the use of bauxite ore high in aluminum content. Domestic reserves of such high grade are totally inadequate to meet current production requirements.

The difficulty in producing aluminum with respect to thermal processes does not reside in the formation of the aluminum via reduction of the alumina-bearing ores, but rather, in the recovery of aluminum in a substantially pure state.

Obtaining substantially pure aluminum from a carbothermic process by extremely high operating temperatures can lead to problems with respect to materials of construction.

The most common techniques in attempting to produce aluminum metal of a high degree of purity by direct thermal reduction treat the furnace product, conventionally containing 10–30 weight percent of aluminum carbide, by techniques such as fluxing the furnace product with metal salts to diminish the amount of aluminum carbide contamination.

The molten salts mix with the carbide so removed, and it is costly to remove the carbide from the salt so that the carbide can be recycled to the furnace. Without such recycle, the power consumption and furnace size become uneconomical in comparison with methods practiced commercially for making aluminum.

The furnace product contaminated with aluminum carbide can be heated with a molten slag containing substantial proportions of alumina to cause the alumina in the slag to react with the aluminum carbide in the furnace product, thereby diminishing the furnace product in aluminum carbide.

One mode can be described as the "reduction mode," and it involves reaction between alumina in the slag and aluminum carbide in the furnace product at reduction conditions so as to produce aluminum metal. One way of ascertaining operation in this mode is by detecting the evolution of carbon monoxide.

Another mode of reaction can be described as the "extraction mode," and it involves reaction between the alumina in the slag and the aluminum carbide in the furnace product to produce non-metallic slag compounds such as aluminum tetraoxycarbide, as opposed to producing liquid aluminum. Such "extraction mode" reactions occur at temperatures insufficient to cause reduction to produce additional aluminum and can occur without causing the evolution of carbon monoxide.

Temperatures of at least 2050° C. are necessary for the "reduction mode" operations at reaction zone pressures of one atmosphere. At any given pressure, the temperature required for "reduction mode" operation increases as the level of aluminum carbide in the metal decreases. On the other hand, "extraction mode" operations can take place below 2050° C.

Slags containing calcium oxide can be used to lower the melting point. The majority of the slag does not have to be at the reduction temperature. It only has to be molten and at a high enough temperature to exist as a molten layer separate from the metal layer.

The slags used are those wherein the weight ratio of alumina to any aluminum carbide contained therein is at least 4:1.

In the production of aluminum, various methods are employed which utilize specific electric arc furnaces. In one method, a first furnace is charged with carbon in the form of coke along with aluminum oxycarbide slag. The furnace is heated to a temperature of about 2000° C. resulting in the formation of aluminum carbide along with some aluminum and slag. The aluminum carbide is charged into the second furnace either in the molten state, or it is permitted first to cool after which it is crushed to a suitable size prior to charging. In the second furnace, the aluminum carbide is reacted with alumina to form aluminum which is recovered, and slag is returned to the first furnace.

Since the temperature required for the reduction of aluminum is relatively high, usually about 2000° C., and since the heat transfer rate between bodies of disparate temperature is directly related to the temperature differences between the two bodies, it is advantageous from an energy conservation standpoint to retain any material being transported from a first reduction stage to a second stage in a high temperature ambient. In smelting processes using separate furnaces, considerable heat is lost, requiring the addition of this lost energy in the second furnace, whether intermediate products are delivered to the second furnace in a molten or in a solid, crushed state. Exposure of intermediate products to ambient air often results in undesirable chemical reactions.

Smelting processes employing two or three furnaces also have substantial manpower requirements. Because of the additional energy, equipment and manpower required, these processes are accompanied by unnecessarily high costs. Further, these methods result in a degree of physical loss of intermediate or final product because of repeated handling.

A practical and readily available source of aluminum contaminated with no more than about 5 weight percent of aluminum carbide can be achieved by the process and apparatus of the present invention.

SUMMARY OF THE INVENTION

The present invention provides a process for forming aluminum metal from the carbothermic direct reduction of alumina ore. An alumina ore is heated in the presence of carbon at an elevated temperature above about 2000° C. to produce an aluminum metal. Aluminum metal or aluminum metal alloy scrap then is added as a solid coolant to reduce the temperature to about 900–1000° C. and precipitate out aluminum carbide. The precipitated aluminum carbide is filtered, decanted, or fluxed with salt to form an aluminum metal produced by the carbothermic direct reduction of alumina ore and containing 5% by wt. or less aluminum carbide.

Scrap aluminum used in the aluminum production process of the invention can be obtained from several different sources, including consumer scrap, vehicle scrap, and plant scrap. Consumer scrap refers to aluminum alloy products, especially beverage and food cans, coated with various polymeric coatings. Vehicle scrap refers to aluminum alloy material obtained from junked motor vehicles. Plant scrap refers to waste material from aluminum manufacturing plants, such as defective sheet generated during drawing and ironing processes.

Recycled scrap aluminum alloy cans are compacted and baled. The cans are then reduced to shreds by a grinder, hammer mill or rotating knives so that they are in the form of small fragments of approximately 2–4 cm nominal diameter.

The shredded scrap is subjected to magnetic separation to remove iron and steel contaminants, and to gravity or cyclone separation to remove paper and other light weight contaminants. The cleaned scrap is then introduced into a delacquering furnace. Air heated to a temperature typically about 480–540° C. is blown through the bed of scrap while it moves along on a steel conveyor belt. This temperature is sufficient to pyrolize organic matter but not to oxidize the aluminum alloy scrap.

Most aluminum alloy scrap is largely made up of recycled beverage cans containing about 25% by weight AA5182 can ends and about 75% by weight AA3004 can bodies. The typical compositions of these alloys are as follows, in weight %.

AA3004—Mg 0.9, Mn 1.0, Fe 0.45, Si 0.2, Ti 0.04, and Cu 0.18. AA5182—Mg 4.5, Mn 0.25, Fe 0.25, Si 0.12, Ti 0.05, and Cu 0.08.

DETAILED DESCRIPTION

Carbothermic production of aluminum uses carbon and an alumina bearing material reacted at 2050° C. and higher in an arc furnace chemically to produce aluminum. This process produces an alloy that contains 30–10% by wt. $Al_4C_3$.

Preferably, an increase in temperature from 2050° C. to 2150° C. reduces the amount of $Al_4C_3$, which is desired to produce primary aluminum. However, the higher temperature makes for a more volatile aluminum species in the system. The species in the system include an alumina rich slag and the aluminum metal that contains $Al_4C_3$. Excessive aluminum species are lost by volatilization, and the process becomes uneconomical. An operating practice to minimize volatilization of the aluminum species uses a carbon column through which the volatile species must pass to recapture them. The carbon column process has not been successful because of a difficulty of controlling power input to raise temperature while minimizing volatilization of aluminum species.

The process of the present invention utilizes a carbon-alumina reaction at a temperature of about 2050° C. to form a first aluminum-$Al_4C_3$ product at 10–30% by wt. $Al_4C_3$ at a point of minimum volatilization. The first aluminum-$Al_4C_3$ product of the present invention is then contacted with sufficient scrap aluminum to bring the temperature to approximately 1000–900° C. during which the $Al_4C_3$ precipitates out as a solid from which it can be filtered, decanted, and/or removed by fluxing. The process and apparatus of the present invention produce an aluminum that is acceptable as primary aluminum with minimum $Al_4C_3$ contamination. The reduction of the temperature minimizes the loss of volatile species and provides a heat source to melt scrap. The scrap melting rate is approximately equivalent to the production rate of the aluminum-$Al_4C_3$ production. For example, in a carbothermic process producing 1000 lbs./hr., scrap is melted at the rate of 1000 lbs./hr. to produce a metal stream product of the present invention of 2000 lbs./hr. $Al_4C_3$ is filtered out and recycled back to the carbothermic reactor to capture the aluminum values in the $Al_4C_3$.

The method and apparatus of the present invention achieve a minimized volatilization of aluminum species and utilize the sensible heat in the aluminum-$Al_4C_3$ product to melt the scrap in the second stage of the process and apparatus of the present invention.

The primary furnace product in the carbothermic reduction process consists of a molten body containing aluminum metal with 10–30%, preferably 10–15%, by weight aluminum carbide at approximately 2100° C.

This product contains significant excess sensible heat, but when a mixture of 10% or more carbide is cooled to about 1400° C., the aluminum carbide forms a cellular structure that entraps liquid aluminum, rendering the melt difficult to pour.

As a result, unless extremely high temperatures are maintained throughout all the process steps, transporting the product mixture to purify it becomes extremely difficult.

The present invention includes adding aluminum scrap to the melt as a solid coolant utilizing the excess sensible heat of the primary furnace product, while diluting the carbide to preserve fluidity, and extending productivity at minimal capital cost.

The scrap recycle capacity, i.e., the capacity of the melt to absorb scrap includes a sensible heat available to cool the melt from 2100 to 1000° C. on the order of 8.346 kcal/mol. The latent heat to melt scrap is 2.072 kcal/mol. The sensible heat to bring scrap to 1000° C. is 5.326 kcal/mol. Accordingly, the capacity of the melt to melt scrap is about 1.128 kg Al scrap/kg of furnace product. The solid scrap coolant may be added to the melt in various proportions ranging from about 0.2 to 1.1 kg scrap per kg of furnace product, preferably about 0.5–1.1, and optimally about 0.8–1.

The scrap recycle process of the present invention includes adding scrap aluminum to the furnace product immediately after tapping or tapping into a crucible containing the dried scrap. The product should remain fluid by precipitating out aluminum carbide in fine form upon cooling and avoiding the cellular carbide structure, and by reducing the concentration of carbide below the problem region. The process of the present invention further includes filtering or decanting the carbide and recycling it to the furnace, thereby leaving a molten aluminum alloy body having reduced aluminum carbide content.

Advantages of the scrap recycle include utilization of the sensible heat in the furnace product, preservation of melt, improved fluidity, improvement of separation of carbide, and an increase of metal production with minimal additional capital expense.

While the invention has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A process for producing aluminum by carbothermic reduction of alumina, comprising;

(a) reacting alumina with carbon at an elevated temperature to produce a molten body comprising aluminum and aluminum carbide;

(b) mixing with said molten body a solid coolant comprising aluminum or an aluminum alloy, thereby to cool said body and to precipitate aluminum carbide; and (c) separating the precipitated aluminum carbide from said molten body, thereby to form a molten body having reduced aluminum carbide content.

2. A process according to claim 1 wherein said solid coolant comprises scrap aluminum.

3. A process according to claim 1 wherein step (a) comprises reacting alumina with carbon in an arc furnace at a temperature above 1800° C.

4. A process according to claim 3 wherein the temperature in said arc furnace is above 2000° C.

5. A process according to claim 3 wherein the temperature in said arc furnace is about 2000–2100° C.

6. A process according to claim 1 wherein the molten body of step (a) comprises about 10–30 wt. % aluminum carbide.

7. A process according to claim 1 wherein the molten body of step (a) comprises about 10–15 wt. % aluminum carbide.

8. A process according to claim 1 wherein step (b) cools said molten body to a temperature of about 900–1000° C.

9. A process according to claim 1 wherein the molten body of step (c) contains no more than about 5 wt. % aluminum carbide.

10. A process for producing aluminum, comprising (a) reacting alumina at an elevated temperature to produce a molten body comprising aluminum and about 10–30 wt. % aluminum carbide, (b) mixing with said molten body a solid coolant comprising scrap aluminum at a ratio of about 0.2–1.1 kg scrap aluminum per kg of the molten body, thereby to cool said molten body, improve its fluidity, and precipitate aluminum carbide, and (c) separating the precipitated aluminum carbide from said molten body, thereby to form a molten body having reduced aluminum carbide content.

11. A process according to claim 10, wherein scrap aluminum is mixed with said molten body at a ratio of about 0.5–1.1 kg scrap aluminum per kg of the molten body.

12. A process according to claim 10, wherein scrap aluminum is mixed with said molten body at a ratio of about 0.8–1 kg scrap. aluminum per kg of the molten body.

13. A process according to claim 10, wherein step (a) comprises reacting alumina with carbon at a temperature above 1800° C.

* * * * *

UNITED STATES PATENT AND TRADEMARK OFFICE
CERTIFICATE OF CORRECTION

PATENT NO.    : 6,475,260 B2
DATED         : November 5, 2002
INVENTOR(S)   : Alfred F. LaCamera It is certified that error appears in the above-identified patent and that said Letters Patent is hereby corrected as shown below:

<u>Column 1,</u>
Before line 6, insert the following paragraph:

-- Statement Regarding Federally Funded Research

The subject matter of this application was made with United States Government support Contract No. DE-FC36-OOID13900 awarded by The Department of Energy. The United States Government has certain rights to this invention. --.

Signed and Sealed this

Sixth Day of September, 2005

JON W. DUDAS
*Director of the United States Patent and Trademark Office*